(12) United States Patent
Stanciu et al.

(10) Patent No.: US 10,427,571 B2
(45) Date of Patent: Oct. 1, 2019

(54) VEHICULAR SEAT ELEMENT

(71) Applicant: Proprietect L.P., Toronto (CA)

(72) Inventors: Romeo Stanciu, Toronto (CA);
Lawrence Stephen Becke, Mississauga (CA); Mark Donald Weierstall, Roseville, MI (US)

(73) Assignee: PROPRIETECT L.P., Toronto (CA)

( * ) Notice: Subject to any disclaimer, the term of this patent is extended or adjusted under 35 U.S.C. 154(b) by 0 days.

(21) Appl. No.: 15/553,766

(22) PCT Filed: Feb. 26, 2016

(86) PCT No.: PCT/CA2016/050199
§ 371 (c)(1),
(2) Date: Aug. 25, 2017

(87) PCT Pub. No.: WO2016/134479
PCT Pub. Date: Sep. 1, 2016

(65) Prior Publication Data
US 2018/0236916 A1    Aug. 23, 2018

Related U.S. Application Data

(60) Provisional application No. 62/121,687, filed on Feb. 27, 2015.

(51) Int. Cl.
*B60N 2/58*   (2006.01)
*B60N 2/70*   (2006.01)
(Continued)

(52) U.S. Cl.
CPC ............... *B60N 2/70* (2013.01); *B60N 2/643* (2013.01); *B60N 2/646* (2013.01); *B60N 2/7017* (2013.01); *G01L 1/005* (2013.01)

(58) Field of Classification Search
CPC .......... B60N 2/643; B60N 2/646; B60N 2/70; B60N 2/7017; G01L 1/005
(Continued)

(56) References Cited

U.S. PATENT DOCUMENTS

| | | | |
|---|---|---|---|
| 4,522,447 A * | 6/1985 | Snyder | A47C 7/022 297/452.27 |
| 4,951,334 A * | 8/1990 | Maier | A61G 5/1043 297/452.27 X |

(Continued)

FOREIGN PATENT DOCUMENTS

| | | |
|---|---|---|
| DE | 10149029 | 4/2003 |
| WO | 2011/041840 A1 | 4/2011 |

OTHER PUBLICATIONS

International Search Report and Written Opinion, dated Jun. 6, 2017, in International application No. PCT/CA2016/050199, filed Feb. 26, 2016.

(Continued)

*Primary Examiner* — Rodney B White
(74) *Attorney, Agent, or Firm* — Michael Stanley Tomsa; McAndrews, Held & Malloy, Ltd.

(57) ABSTRACT

There is disclosed a vehicular seat element comprising a first major surface, a second major surface and a foam core element disposed therebetween. The first major surface is configured to be in contact with an occupant of the vehicle and the second major surface is configured to be in contact with a support surface of the vehicle. The first major surface comprises a rate sensitive foam element secured with respect to the foam core element. The foam core element and the rate sensitive foam element are different from one another.

29 Claims, 1 Drawing Sheet

(51) Int. Cl.
*B60N 2/64* (2006.01)
*G01L 1/00* (2006.01)

(58) Field of Classification Search
USPC .................................................. 297/452.27
See application file for complete search history.

(56) References Cited

U.S. PATENT DOCUMENTS

| | | | |
|---|---|---|---|
| 5,189,747 A | 3/1993 | Mundy et al. | |
| 5,294,181 A * | 3/1994 | Rose ...................... | A47C 7/021 |
| | | | 297/452.27 X |
| 5,442,823 A * | 8/1995 | Siekman ................. | A47C 7/022 |
| | | | 297/452.27 |
| 5,553,924 A | 9/1996 | Cantor et al. | |
| 5,564,144 A * | 10/1996 | Weingartner ............. | A47C 7/26 |
| | | | 297/452.27 |
| 5,855,415 A * | 1/1999 | Lilley, Jr. ................ | A47C 7/021 |
| | | | 297/452.27 |
| 6,520,541 B1 * | 2/2003 | Cantor .................. | B60N 2/4221 |
| | | | 297/452.27 X |
| 6,790,871 B1 | 9/2004 | Farkas et al. | |
| 6,817,674 B2 * | 11/2004 | Fujita .................. | B60N 2/42709 |
| | | | 297/452.27 X |
| 7,022,746 B2 | 4/2006 | Lockwood et al. | |
| 7,040,706 B2 * | 5/2006 | Koffler .................. | A47C 7/022 |
| | | | 297/452.27 X |
| 7,238,730 B2 | 7/2007 | Apichatachutapan et al. | |
| 7,585,030 B2 * | 9/2009 | Galbreath ................ | B60N 2/70 |
| | | | 297/452.27 |
| 7,614,704 B2 * | 11/2009 | Whelan .................. | A47C 7/021 |
| | | | 297/452.27 X |
| 7,661,764 B2 * | 2/2010 | Ali .......................... | B68G 7/05 |
| | | | 297/452.27 X |
| 7,934,774 B2 * | 5/2011 | Galbreath ................ | B60N 2/70 |
| | | | 297/452.27 |
| 8,141,957 B2 * | 3/2012 | McClung ................ | A47C 7/282 |
| | | | 297/452.27 |
| 8,215,714 B2 * | 7/2012 | Galbreath ................ | B60N 2/70 |
| | | | 297/452.27 |
| 8,282,164 B2 * | 10/2012 | Galbreath .............. | A47C 7/748 |
| | | | 297/452.27 X |
| 8,291,535 B2 * | 10/2012 | Kemper ................ | A61G 5/1043 |
| | | | 297/452.27 |
| 8,662,560 B2 * | 3/2014 | Galbreath ............ | B60N 2/5816 |
| | | | 297/452.27 X |
| 8,696,067 B2 * | 4/2014 | Galbreath .............. | B60N 2/012 |
| | | | 297/452.27 X |
| 2003/0186044 A1 | 10/2003 | Sauniere et al. | |
| 2004/0145230 A1 * | 7/2004 | Fujita .................. | A47C 31/006 |
| | | | 297/452.27 |
| 2006/0273650 A1 | 12/2006 | Embach | |

OTHER PUBLICATIONS

Office Action, dated May 1, 2018, in Canadian Application No. 2,977,551.

Office Action, dated Oct. 24, 2018, in European Application No. 16754711.6.

* cited by examiner

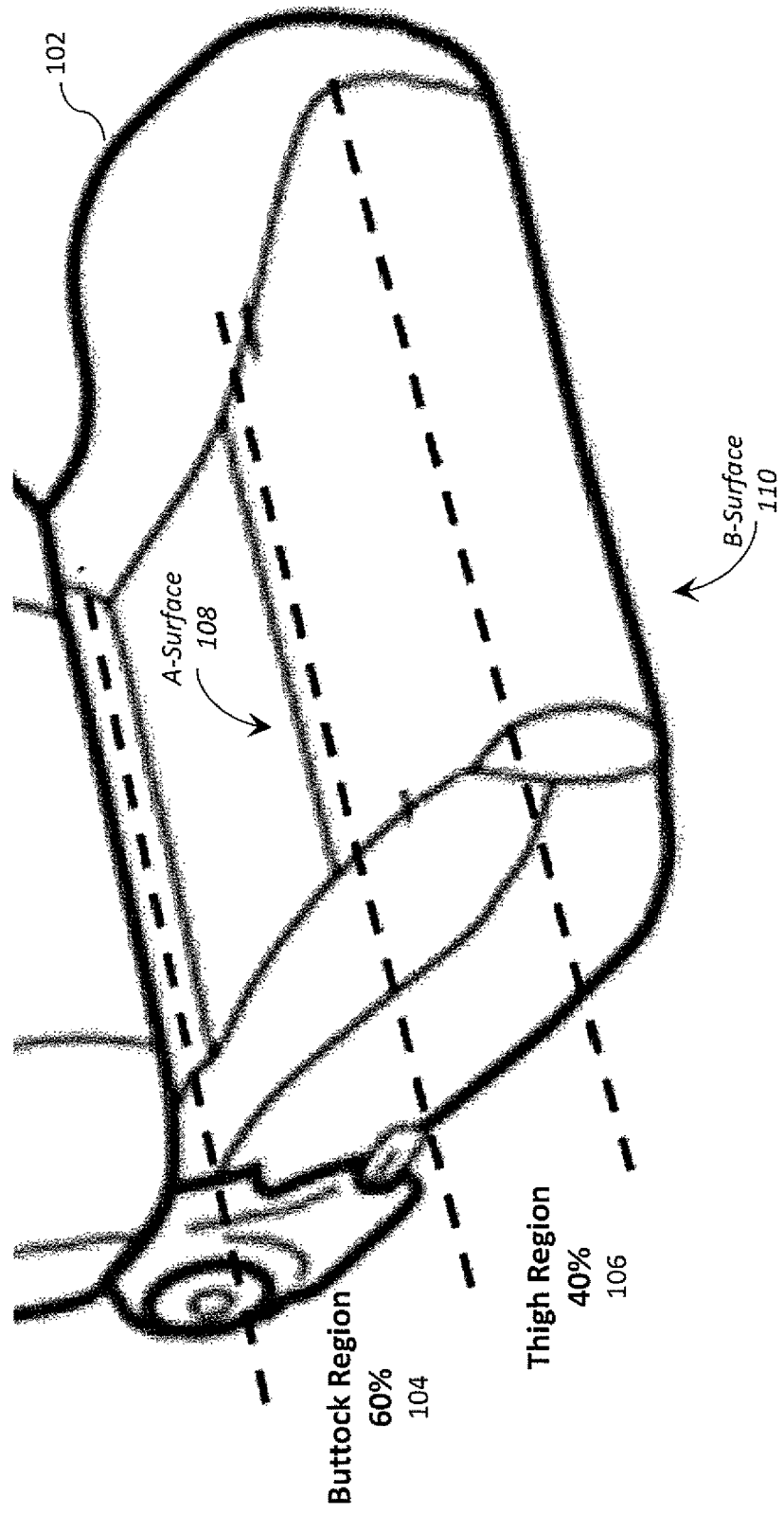

VEHICULAR SEAT ELEMENT

CROSS-REFERENCE TO RELATED APPLICATION

The present application is a National Phase Entry of PCT International Application No. PCT/CA2016/050199, which was filed on Feb. 26, 2016, and claims the benefit under 35 U.S.C. § 119(e) of U.S. provisional patent application Ser. No. 62/121,687, filed Feb. 27, 2015, the contents of which are hereby incorporated by reference.

BACKGROUND OF THE INVENTION

Field of the Invention

The present invention relates to a vehicular seat element.

Description of the Prior Art

Passenger seats in vehicles, such as automobiles, are typically fabricated from a foam (usually polyurethane) material which is molded into the desired shape and covered with an appropriate trim cover. The foamed material is selected to provide passenger comfort by providing a resilient seat and the trim cover is selected to provide the desired aesthetic properties.

Conventional vehicular seats are typically manufacture from polyurethane foam, in particular high resiliency (HR) polyurethane foam. Typical HR polyurethane foam has an impact resilience (i.e., ball rebound) greater than 50%. Further, typical HR polyurethane foam is also generally taken to encompass the foams known as cold-cure foam.

HR molded foams offer several advantages. First, the typically possess a support factor (ratio of 65% IFD to 25% IFD) that is superior to that of conventional slab or hot-molded foams. Second, the amount of energy required to accelerate foam cure and develop final properties is less. Third, HR molded foams can be formulated to meet the requirements of various small-scale flammability tests.

Designers of vehicular seats conventionally select a specification profile generally near the $50^{th}$ percentile of weight and size of male passengers who occupy the seats. Practically, this means that most commercially available vehicular seats have specification profile that achieves a target comfort for a person who weighs approximately 175 pounds (79.5 kilograms) and is approximately 5 feet, 11 inches (180.3 cm) tall.

One parameter of target comfort for designers of vehicular seats is the so-called "under-thigh" portion of the seating surface. This portion of the seating surface is important since pressure applied to the under-thigh portion of the seat occupant can negatively affect blood flow leading to discomfort of the seat occupant.

A problem associated with selection a specification profile generally near the $50^{th}$ percentile of weight and size of passengers who occupy the seats is that a significant portion of vehicular passengers do not weigh approximately 175 pounds (79.5 kilograms) and/or are not approximately 5 feet, 11 inches (180.3 cm) tall—e.g., large individuals, tall individuals and a significant proportion of women and children. Thus, this significant portion of vehicular passengers are highly likely not to benefit from the target comfort associated with the specification profile for most commercially available vehicular seats. This problem is exacerbated by the fact the seat designers are typically constrained to use foam materials which have a substantially uniform specification profile across all operation temperatures of the vehicle (e.g., −40° to 85° C.)—e.g., HR polyurethane foam.

Thus, it would be highly desirable to have a vehicular seat element having a specification profile that proves a larger window of target comfort for this significant portion of vehicular passengers. For example, it would be highly desirable if the window of target comfort for a given vehicular seat element extended from $5^{th}$ percentile to $95^{th}$ percentile of weight and size of passengers who occupy the seats:

|  | Male | | Female | |
| --- | --- | --- | --- | --- |
|  | Height (cm/in) | Weight (kg/lb) | Height (cm/in) | Weight (kg/lb) |
| 5th | 163/64.0 | 63.50/140.0 | 157/62.0 | 49.44/109 |
| 50th | 173/68.0 | 79.15/174.5 | 166/65.5 | 63.50/140 |
| 95th | 183/72.0 | 97.30/214.5 | 178/70.0 | 76.66/169 |

It would further highly desirable if such a larger window of target comfort was manifested, for example, in a reduction in pressure to the seat occupant in the area of the seating surface substantially corresponding to the under-thigh region of the occupant.

SUMMARY OF THE INVENTION

It is an object of the present invention to obviate or mitigate at least one of the above-mentioned disadvantages of the prior art.

It is another object of the present invention to provide a novel vehicular seat element.

Accordingly, in one of its aspects, the present invention provides a vehicular seat element comprising a first major surface, a second major surface and a foam core element disposed therebetween, the first major surface configured to be in contact with an occupant of the vehicle and the second major surface configured to be in contact with a support surface of the vehicle, the first major surface comprising a rate sensitive foam element secured with respect to the foam core element, the foam core element and the rate sensitive foam element being different.

Thus, the present inventors have developed an improved vehicular seat element which comprises a rate sensitive foam element on at least a portion of the so-called A-surface (occupant contacting surface) thereof in combination with a foam core element (e.g., made from a conventional HR polyurethane foam). In a highly preferred embodiment, the rate sensitive foam is selected to achieve an improvement of the force applied to an occupant (real or test form) by the area of the A-surface corresponding to the under-thigh portion of the occupant compared to a vehicular seat element made from 100% of the foam used for the foam core element.

The term "rate sensitive foam element" is used interchangeably throughout this specification with the term "viscoelastic foam". As is known in the art, a viscoelastic foam exhibits slower recovery when a compression force is released than do other resilient polyurethane foams. For example, after being released from compression, a resilient polyurethane foam at room temperature, atmospheric condition generally recovers to its full uncompressed height or thickness in one second or less. By contrast, a viscoelastic foam of the same density and thickness, and at the same room temperature condition, will take significantly longer to recover, even from two to sixty seconds. The recovery time of viscoelastic foams is sensitive to temperature changes within a range close to standard room temperature. Viscoelastic foams also exhibit ball rebound values of generally less than about 25% as compared to about 40% or more for other polyurethane foams A precise definition of a viscoelastic foam is derived by a dynamic mechanical analysis to measure the glass transition temperature (Tg) of the foam. Nonviscoelastic resilient polyurethane foams, based on a 3000 molecular weight polyether triol, generally have glass transition temperatures below −30° C., and possibly even below −50° C. By contrast, viscoelastic polyurethane foams have glass transition temperatures above −20° C. The viscoelastic properties of polyurethane foams are exhibited in the vicinity of there Tg.

As used throughout this specification, the term "seat element" is used in connection with one, some or all of a cushion (i.e., the portion of the seat on which the occupant sits), a back or back rest (i.e., the portion of the seat which supports the back of the occupant) and a side bolster (i.e., the extension of the cushion, back or the back rest, which laterally supports the occupant). As is known in the vehicular (e.g., automotive, airline and the like) industries, a "seat" includes both a cushion and a back (or back rest). Thus, as used herein, the term "seat element" includes a cushion, a back (or back rest) or a unit construction comprising a cushion and a back (or back rest).

As used throughout this specification, the terms "vehicle" and "vehicular" are intended to have a broad meaning and encompass all vehicles—e.g., automobiles, motorcycles, trucks, airplanes, snowmobiles and the like. In a highly preferred embodiment, the present vehicular seat element is in the form of an automobile (e.g., car) seat element.

Preferably at least one, more preferably both, of the foam core element and rate sensitive foam element are molded.

BRIEF DESCRIPTION OF THE DRAWINGS

Embodiments of the present invention will be described with reference to the accompanying drawings, in which:

FIG. 1 illustrates of schematic of a seat element that was used for testing done in accordance with the example described below.

DETAILED DESCRIPTION OF THE PREFERRED EMBODIMENTS

The present invention relates to a vehicular seat element comprising a first major surface, a second major surface and a foam core element disposed therebetween, the first major surface configured to be in contact with an occupant of the vehicle and the second major surface configured to be in contact with a support surface of the vehicle, the first major surface comprising a rate sensitive foam element secured with respect to the foam core element, the foam core element and the rate sensitive foam element being different. Preferred embodiments of this vehicular seat element may include any one or a combination of any two or more of any of the following features:

the foam core portion comprises a polyurethane foam;
the foam core portion comprises a high resiliency (HR) polyurethane foam;
the HR polyurethane foam has a density in the range of from about 20 to about 90 kg/m$^3$ when determined according to ASTM D3574-11 (Test A);
the HR polyurethane foam has a density in the range of from about 40 to about 65 kg/m$^3$ when determined according to ASTM D3574-11 (Test A);
the HR polyurethane foam has a density in the range of from about 50 to about 60 kg/m$^3$ when determined according to ASTM D3574-11 (Test A);
the HR polyurethane foam has a tear strength in the range of from about 400 to about 1200 N/m when determined according to ASTM D3574-11 (Test F);
the HR polyurethane foam has a tear strength in the range of from about 700 to about 1100 N/m when determined according to ASTM D3574-11 (Test F);
the HR polyurethane foam has a tear strength in the range of from about 800 to about 900 N/m when determined according to ASTM D3574-11 (Test F);
the HR polyurethane foam has an elongation at break in the range of from about 80% to about 170% when determined according to ASTM D3574-11 (Test E);
the HR polyurethane foam has an elongation at break in the range of from about 100% to about 150% when determined according to ASTM D3574-11 (Test E);
the HR polyurethane foam has an elongation at break in the range of from about 110% to about 140% when determined according to ASTM D3574-11 (Test E);
the HR polyurethane foam has a tensile strength in the range of from about 80 to about 250 kPa when determined according to ASTM D3574-11 (Test E);
the HR polyurethane foam has a tensile strength in the range of from about 175 to about 225 kPa when determined according to ASTM D3574-11 (Test E);
the HR polyurethane foam has a tensile strength in the range of from about 180 to about 200 kPa when determined according to ASTM D3574-11 (Test E);
the HR polyurethane foam has a ball rebound of at least about 40% when determined according to ASTM D3574-11 (Test H);
the HR polyurethane foam has a ball rebound in the range of from about 55% to about 75% when determined according to ASTM D3574-11 (Test H);
the HR polyurethane foam has a ball rebound in the range of from about 60% to about 70% when determined according to ASTM D3574-11 (Test H);
the HR polyurethane foam has a hysteresis loss of less than about 50% when determined according to ASTM D3574-11 (Appendix X6.2—Procedure A);
the HR polyurethane foam has a hysteresis loss in the range of from about 15% to about 45% when determined according to ASTM D3574-11 (Appendix X6.2—Procedure A);
the HR polyurethane foam has a hysteresis loss of from about 20% to about 30% when determined according to ASTM D3574-11 (Appendix X6.2—Procedure A);
the HR polyurethane foam has an indentation load deflection at 50% at 100 mm thickness in the range of from about 175 N to about 800 N when determined according to ASTM D3574-11 (Test B$_1$);
the HR polyurethane foam has an indentation load deflection at 50% at 100 mm thickness in the range of from about 220 N to about 600 N when determined according to ASTM D3574-11 (Test B$_1$);
the HR polyurethane foam has an indentation load deflection at 50% at 100 mm thickness in the range of from about 230 N to about 400 N when determined according to ASTM D3574-11 (Test B$_1$);
the HR polyurethane foam has an 50% wet compression set of less than 30% when determined according to ASTM D3574-11 (Test B$_1$);
the HR polyurethane foam has an 50% wet compression set in the range of from about 5% to about 18% when determined according to ASTM D3574-11 (Test L);

the HR polyurethane foam has an 50% wet compression set in the range of from about 10% to about 15% when determined according to ASTM D3574-11 (Test L);

the HR polyurethane foam has a CFP indentation force deflection loss in the range of less than about 30% when determined according to ASTM D3574-11 (Test $I_3$);

the HR polyurethane foam has a CFP indentation force deflection loss in the range of from about 10% to about 20% when determined according to ASTM D3574-11 (Test $I_3$);

the HR polyurethane foam has a CFP indentation force deflection loss in the range of from about 10% to about 18% when determined according to ASTM D3574-11 (Test $I_3$);

the HR polyurethane foam has a CFP height loss in the range of less than about 10% when determined according to ASTM D3574-11 (Test $I_3$);

the HR polyurethane foam has a CFP height loss in the range of from about 1% to about 7% when determined according to ASTM D3574-11 (Test $I_3$);

the HR polyurethane foam has a CFP height loss in the range of from about 2% to about 5% when determined according to ASTM D3574-11 (Test $I_3$);

the rate sensitive foam element has a density in the range of from about 20 to about 90 kg/m$^3$ when determined according to ASTM D3574-11 (Test A);

the rate sensitive foam element has a density in the range of from about 45 to about 65 kg/m$^3$ when determined according to ASTM D3574-11 (Test A);

the rate sensitive foam element has a density in the range of from about 50 to about 60 kg/m$^3$ when determined according to ASTM D3574-11 (Test A);

the rate sensitive foam element has a tear strength in the range of from about 300 to about 800 N/m when determined according to ASTM D3574-11 (Test F);

the rate sensitive foam element has a tear strength in the range of from about 425 to about 700 N/m when determined according to ASTM D3574-11 (Test F);

the rate sensitive foam element has a tear strength in the range of from about 450 to about 550 N/m when determined according to ASTM D3574-11 (Test F);

the rate sensitive foam element has an elongation at break in the range of from about 80% to about 350% when determined according to ASTM D3574-11 (Test E);

the rate sensitive foam element has an elongation at break in the range of from about 160% to about 300% when determined according to ASTM D3574-11 (Test E);

The vehicular seat element defined in any one of claims 1-39, wherein the rate sensitive foam element has an elongation at break in the range of from about 200% to about 275% when determined according to ASTM D3574-11 (Test E);

the rate sensitive foam element has a tensile strength in the range of from about 100 to about 250 kPa when determined according to ASTM D3574-11 (Test E);

the rate sensitive foam element has a tensile strength in the range of from about 80 to about 200 kPa when determined according to ASTM D3574-11 (Test E);

the rate sensitive foam element has a tensile strength in the range of from about 120 to about 180 kPa when determined according to ASTM D3574-11 (Test E);

the rate sensitive foam element has a ball rebound of less than about 40% when determined according to ASTM D3574-11 (Test E);

the rate sensitive foam element has a ball rebound in the range of from about 10% to about 40% when determined according to ASTM D3574-11 (Test H);

the rate sensitive foam element has a ball rebound in the range of from about 15% to about 35% when determined according to ASTM D3574-11 (Test H);

the rate sensitive foam element has a hysteresis loss of less than about 60% when determined according to ASTM D3574-11 (Appendix X6.2—Procedure A);

the rate sensitive foam element has a hysteresis loss in the range of from about 25% to about 55% when determined according to ASTM D3574-11 (Appendix X6.2—Procedure A);

the rate sensitive foam element has a hysteresis loss of from about 25% to about 40% when determined according to ASTM D3574-11 (Appendix X6.2—Procedure A);

the rate sensitive foam element has an indentation load deflection at 50% at 100 mm thickness in the range of from about 50 N to about 500 N when determined according to ASTM D3574-11 (Test $B_1$);

the rate sensitive foam element has an indentation load deflection at 50% at 100 mm thickness in the range of from about 60 N to about 180 N when determined according to ASTM D3574-11 (Test $B_1$);

the rate sensitive foam element has an indentation load deflection at 50% at 100 mm thickness in the range of from about 80 N to about 150 N when determined according to ASTM D3574-11 (Test $B_1$);

the rate sensitive foam element has an 50% wet compression set of less than 39% when determined according to ASTM D3574-11 (Test L);

the rate sensitive foam element has an 50% wet compression set in the range of from about 1% to about 10% when determined according to ASTM D3574-11 (Test L);

the rate sensitive foam element has an 50% wet compression set in the range of from about 1% to about 5% when determined according to ASTM D3574-11 (Test L);

the rate sensitive foam element has a CFP indentation force deflection loss in the range of less than about 30% when determined according to ASTM D3574-11 (Test $I_3$);

the rate sensitive foam element has a CFP indentation force deflection loss in the range of from about 5% to about 15% when determined according to ASTM D3574-11 (Test $I_3$);

the rate sensitive foam element has a CFP indentation force deflection loss in the range of from about 7% to about 13% when determined according to ASTM D3574-11 (Test $I_3$);

the rate sensitive foam element has a CFP height loss in the range of less than about 20% when determined according to ASTM D3574-11 (Test $I_3$);

the rate sensitive foam element has a CFP height loss in the range of from about 0% to about 5% when determined according to ASTM D3574-11 (Test $I_3$);

the rate sensitive foam element has a CFP height loss in the range of from about 1% to about 3% when determined according to ASTM D3574-11 (Test $I_3$);

the rate sensitive foam element has a ratio of hysteresis loss when determined according to ASTM D3574-11 (Appendix X6.2—Procedure A) to ball rebound when determined according to ASTM D3574-11 (Test H) in the range of from about 0.8 to about 30;

the rate sensitive foam element has a ratio of hysteresis loss when determined according to ASTM D3574-11 (Appendix X6.2—Procedure A) to ball rebound when determined according to ASTM D3574-11 (Test H) in the range of from about 0.8 to about 5.0;

the rate sensitive foam element has a ratio of hysteresis loss when determined according to ASTM D3574-11 (Appendix X6.2—Procedure A) to ball rebound when determined according to ASTM D3574-11 (Test H) in the range of from about 0.8 to about 1.5;

the vehicular seat element, during static testing, has an overall average pressure applied to an occupant of at least about 3% less an overall average pressure applied to an occupant during static testing by a reference vehicular seat element of the same size and shape made with 100% foam used in the foam core portion;

the vehicular seat element, during static testing, has an overall average pressure applied to an occupant of from about 3% to about 18% less an overall average pressure applied to an occupant during static testing by a reference vehicular seat element of the same size and shape made with 100% foam used in the foam core portion;

the vehicular seat element, during static testing, has an overall average pressure applied to an occupant of from about 5% to about 12% less an overall average pressure applied to an occupant during static testing by a reference vehicular seat element of the same size and shape made with 100% foam used in the foam core portion;

the vehicular seat element, during static testing, has an overall average pressure applied to an occupant of from about 7% to about 10% less an overall average pressure applied to an occupant during static testing by a reference vehicular seat element of the same size and shape made with 100% foam used in the foam core portion;

the vehicular seat element, during static testing, has an average pressure applied to an under-thigh portion of an occupant of at least about 5% less an average pressure applied to an under-thigh portion an occupant during static testing by a reference vehicular seat element of the same size and shape made with 100% foam used in the foam core portion;

the vehicular seat element, during static testing, has an average pressure applied to an under-thigh portion of an occupant of at least about 10% less an average pressure applied to an under-thigh portion an occupant during static testing by a reference vehicular seat element of the same size and shape made with 100% foam used in the foam core portion;

the vehicular seat element, during static testing, has an average pressure applied to an under-thigh portion of an occupant of from about 10% to about 40% less an average pressure applied to an under-thigh portion an occupant during static testing by a reference vehicular seat element of the same size and shape made with 100% foam used in the foam core portion;

the vehicular seat element, during static testing, has an average pressure applied to an under-thigh portion of an occupant of from about 10% to about 35% less an average pressure applied to an under-thigh portion an occupant during static testing by a reference vehicular seat element of the same size and shape made with 100% foam used in the foam core portion;

the vehicular seat element, during static testing, has an average pressure applied to an under-thigh portion of an occupant of from about 10% to about 30% less an average pressure applied to an under-thigh portion an occupant during static testing by a reference vehicular seat element of the same size and shape made with 100% foam used in the foam core portion;

the vehicular seat element, during static testing, has an average pressure applied to an under-thigh portion of an occupant of from about 12% to about 27% less an average pressure applied to an under-thigh portion an occupant during static testing by a reference vehicular seat element of the same size and shape made with 100% foam used in the foam core portion;

the vehicular seat element, during static testing, has an average pressure applied to an under-thigh portion of an occupant of from about 15% to about 25% less an average pressure applied to an under-thigh portion an occupant during static testing by a reference vehicular seat element of the same size and shape made with 100% foam used in the foam core portion;

the vehicular seat element, during a pre-conditioning portion of dynamic testing, has an overall average pressure of at least about 10% less an overall average pressure during a pre-conditioning portion dynamic testing of a vehicular seat element of the same size and shape made with 100% foam used in the foam core portion, wherein the pre-conditioning portion of dynamic testing comprises measuring the overall average pressure applied to a 61 kg mass placed on the first major surface of the vehicular seat element for 30 seconds;

the vehicular seat element, during a pre-conditioning portion of dynamic testing, has an overall average pressure of at least about 15% less an overall average pressure during a pre-conditioning portion dynamic testing of a vehicular seat element of the same size and shape made with 100% foam used in the foam core portion, wherein the pre-conditioning portion of dynamic testing comprises measuring the overall average pressure applied to a 61 kg mass placed on the first major surface of the vehicular seat element for 30 seconds;

the vehicular seat element, during a pre-conditioning portion of dynamic testing, has an overall average pressure of from about 15% to about 30% less an overall average pressure during a pre-conditioning portion dynamic testing of a vehicular seat element of the same size and shape made with 100% foam used in the foam core portion, wherein the pre-conditioning portion of dynamic testing comprises measuring the overall average pressure applied to a 61 kg mass placed on the first major surface of the vehicular seat element for 30 seconds;

the vehicular seat element, during a pre-conditioning portion of dynamic testing, has an overall average pressure of from about 15% to about 25% less an overall average pressure during a pre-conditioning portion dynamic testing of a vehicular seat element of the same size and shape made with 100% foam used in the foam core portion, wherein the pre-conditioning portion of dynamic testing comprises measuring the overall average pressure applied to a 61 kg mass placed on the first major surface of the vehicular seat element for 30 seconds;

the vehicular seat element, during a pre-conditioning portion of dynamic testing, has an overall average pressure of from about 15% to about 20% less an overall average pressure during a pre-conditioning portion dynamic testing of a vehicular seat element of the same size and shape made with 100% foam used in the foam core portion, wherein the pre-conditioning portion of dynamic testing comprises measuring the overall average pressure applied to a 61 kg mass placed on the first major surface of the vehicular seat element for 30 seconds;

the vehicular seat element, during a pre-conditioning portion of dynamic testing, has an under-thigh average pressure of at least about 35% less an under-thigh average pressure during a pre-conditioning portion dynamic testing of a vehicular seat element of the same size and shape made with 100% foam used in the foam core portion, wherein the pre-conditioning portion of dynamic testing comprises measuring the overall average pressure applied to a 61 kg mass placed on the first major surface of the vehicular seat element for 30 seconds;

the vehicular seat element, during a pre-conditioning portion of dynamic testing, has an under-thigh average pressure of from about 35% to about 60% less an under-thigh average pressure during a pre-conditioning portion dynamic testing of a vehicular seat element of the same size and shape made with 100% foam used in the foam core portion, wherein the pre-conditioning portion of dynamic testing comprises measuring the overall average pressure applied to a 61 kg mass placed on the first major surface of the vehicular seat element for 30 seconds;

the vehicular seat element, during a pre-conditioning portion of dynamic testing, has an under-thigh average pressure of from about 35% to about 55% less an under-thigh average pressure during a pre-conditioning portion dynamic testing of a vehicular seat element of the same size and shape made with 100% foam used in the foam core portion, wherein the pre-conditioning portion of dynamic testing comprises measuring the overall average pressure applied to a 61 kg mass placed on the first major surface of the vehicular seat element for 30 seconds;

the vehicular seat element, during a pre-conditioning portion of dynamic testing, has an under-thigh average pressure of from about 35% to about 45% less an under-thigh average pressure during a pre-conditioning portion dynamic testing of a vehicular seat element of the same size and shape made with 100% foam used in the foam core portion, wherein the pre-conditioning portion of dynamic testing comprises measuring the overall average pressure applied to a 61 kg mass placed on the first major surface of the vehicular seat element for 30 seconds;

the vehicular seat element, during a post-conditioning portion of dynamic testing, has an overall average pressure of at least about 10% less an overall average pressure during a post-conditioning portion of dynamic testing of a vehicular seat element of the same size and shape made with 100% foam used in the foam core portion, wherein the post-conditioning portion of dynamic testing comprises: (i) placing a form having a mass of 61 kg on the first major surface of the vehicular seat element, (ii) vertically oscillating the vehicular seat element ±20 mm at 2.3 Hz for 15 minutes, (iii) waiting 30 seconds after completion of (ii), and (iv) measuring the overall average pressure applied to the form;

the vehicular seat element, during a post-conditioning portion of dynamic testing, has an overall average pressure of from about 10% to about 25% less an overall average pressure during a post-conditioning portion of dynamic testing of a vehicular seat element of the same size and shape made with 100% foam used in the foam core portion, wherein the post-conditioning portion of dynamic testing comprises: (i) placing a form having a mass of 61 kg on the first major surface of the vehicular seat element, (ii) vertically oscillating the vehicular seat element ±20 mm at 2.3 Hz for 15 minutes, (iii) waiting 30 seconds after completion of (ii), and (iv) measuring the overall average pressure applied to the form;

the vehicular seat element, during a post-conditioning portion of dynamic testing, has an overall average pressure of from about 10% to about 22% less an overall average pressure during a post-conditioning portion of dynamic testing of a vehicular seat element of the same size and shape made with 100% foam used in the foam core portion, wherein the post-conditioning portion of dynamic testing comprises: (i) placing a form having a mass of 61 kg on the first major surface of the vehicular seat element, (ii) vertically oscillating the vehicular seat element ±20 mm at 2.3 Hz for 15 minutes, (iii) waiting 30 seconds after completion of (ii), and (iv) measuring the overall average pressure applied to the form;

the vehicular seat element, during a post-conditioning portion of dynamic testing, has an average under-thigh pressure of at least about 35% less an average under-thigh pressure during a post-conditioning portion of dynamic testing of a vehicular seat element of the same size and shape made with 100% foam used in the foam core portion, wherein the post-conditioning portion of dynamic testing comprises: (i) placing a form having a mass of 61 kg on the first major surface of the vehicular seat element, (ii) vertically oscillating the vehicular seat element ±20 mm at 2.3 Hz for 15 minutes, (iii) waiting 30 seconds after completion of (ii), and (iv) measuring the average pressure applied to an under-thigh portion of the form;

the vehicular seat element, during a post-conditioning portion of dynamic testing, has an average under-thigh pressure of from about 35% to about 60% less an average under-thigh pressure during a post-conditioning portion of dynamic testing of a vehicular seat element of the same size and shape made with 100% foam used in the foam core portion, wherein the post-conditioning portion of dynamic testing comprises: (i) placing a form having a mass of 61 kg on the first major surface of the vehicular seat element, (ii) vertically oscillating the vehicular seat element ±20 mm at 2.3 Hz for 15 minutes, (iii) waiting 30 seconds after completion of (ii), and (iv) measuring the average pressure applied to an under-thigh portion of the form;

the vehicular seat element, during a post-conditioning portion of dynamic testing, has an average under-thigh pressure of from about 35% to about 55% less an average under-thigh pressure during a post-conditioning portion of dynamic testing of a vehicular seat element of the same size and shape made with 100% foam used in the foam core portion, wherein the post-conditioning portion of dynamic testing comprises: (i) placing a form having a mass of 61 kg on the first major surface of the vehicular seat element, (ii) vertically oscillating the vehicular seat element ±20 mm at 2.3 Hz for 15 minutes, (iii) waiting 30 seconds after completion of (ii), and (iv) measuring the average pressure applied to an under-thigh portion of the form;

the vehicular seat element, during a post-conditioning portion of dynamic testing, has an average under-thigh pressure of from about 40% to about 55% less an average under-thigh pressure during a post-conditioning portion of dynamic testing of a vehicular seat element of the same size and shape made with 100% foam used in the foam core portion, wherein the post-conditioning portion of dynamic testing comprises: (i) placing a form having a mass of 61 kg on the first major surface of the vehicular seat element, (ii) vertically oscillating the vehicular seat element ±20 mm at 2.3 Hz for 15 minutes, (iii) waiting 30 seconds after completion of (ii), and (iv) measuring the average pressure applied to an under-thigh portion of the form;

the rate sensitive foam element comprises a polyurethane foam;

the first major surface comprises a pair of opposed bolster portions and a central portion disposed therebetween;

the rate sensitive foam element is comprised in at least a portion of the central portion and not in the opposed bolster portions;

the rate sensitive foam element is comprised in the entirety of the central portion and at least a portion of each of the opposed bolster portions;

the rate sensitive foam element is comprised in the entirety of the central portion and each of the opposed bolster portions;

the first major surface comprises a rearwardly disposed under-buttocks portion and a frontwardly disposed under-thigh portion adjacent thereto, the rate sensitive foam element being disposed in the under-thigh portion of the first major surface;

the under-thigh portion is comprised in the front 60% portion of the first major surface;

the under-thigh portion is comprised in the front 50% portion of the first major surface;

the rate sensitive foam element is adhered to the foam core element; and/or the rate sensitive foam element and the foam core element are molded to one another.

The preferred foam for use in the foam core element of the vehicular seat element is a foamed isocyanate-based polymer. Preferably, the isocyanate-based polymer is selected from the group comprising polyurethane, polyurea, polyisocyanurate, urea-modified polyurethane, urethane-modified polyurea, urethane-modified polyisocyanurate and urea-modified polyisocyanurate. As is known in the art, the term "modified", when used in conjunction with a polyurethane, polyurea or polyisocyanurate means that up to 50% of the polymer backbone forming linkages have been substituted.

Typically, the foamed isocyanate-based polymer is produced from a reaction mixture which comprises an isocyanate and an active hydrogen-containing compound.

The isocyanate suitable for use in the reaction mixture is not particularly restricted and the choice thereof is within the purview of a person skilled in the art. Generally, the isocyanate compound suitable for use may be represented by the general formula:

$$Q(NCO)_i$$

wherein i is an integer of two or more and Q is an organic radical having the valence of i. Q may be a substituted or unsubstituted hydrocarbon group (e.g., an alkylene or arylene group). Moreover, Q may be represented by the general formula:

$$Q^1\text{-}Z\text{-}Q^1$$

wherein $Q^1$ is an alkylene or arylene group and Z is chosen from the group comprising —O—, —O-$Q^1$-, —CO—, —S—, —S-$Q^1$-S— and —SO$_2$—. Examples of isocyanate compounds which fall within the scope of this definition include hexamethylene diisocyanate, 1,8-diisocyanato-p-methane, xylyl diisocyanate, (OCNCH$_2$CH$_2$CH$_2$OCH$_2$O)$_2$, 1-methyl-2,4-diisocyanato-cyclohexane, phenylene diisocyanates, tolylene diisocyanates, chlorophenylene diisocyanates, diphenylmethane-4, 4'-diisocyanate, naphthalene-1,5-diisocyanate, triphenylmethane-4,4',4"-triisocyanate and isopropylbenzene-alpha-4-diisocyanate.

In another embodiment, Q may also represent a polyurethane radical having a valence of i. In this case Q(NCO)$_i$ is a compound which is commonly referred to in the art as a prepolymer. Generally, a prepolymer may be prepared by reacting a stoichiometric excess of an isocyanate compound (as defined hereinabove) with an active hydrogen-containing compound (as defined hereinafter), preferably the polyhydroxyl-containing materials or polyols described below. In this embodiment, the polyisocyanate may be, for example, used in proportions of from about 30 percent to about 200 percent stoichiometric excess with respect to the proportion of hydroxyl in the polyol. Since the process of the present invention may relate to the production of polyurea foams, it will be appreciated that in this embodiment, the prepolymer could be used to prepare a polyurethane modified polyurea.

In another embodiment, the isocyanate compound suitable for use in the process of the present invention may be selected from dimers and trimers of isocyanates and diisocyanates, and from polymeric diisocyanates having the general formula:

$$Q'(NCO)_i]_j$$

wherein both i and j are integers having a value of 2 or more, and Q' is a polyfunctional organic radical, and/or, as additional components in the reaction mixture, compounds having the general formula:

$$L(NCO)_i$$

wherein i is an integer having a value of 1 or more and L is a monofunctional or polyfunctional atom or radical. Examples of isocyanate compounds which fall with the scope of this definition include ethylphosphonic diisocyanate, phenylphosphonic diisocyanate, compounds which contain a =Si—NCO group, isocyanate compounds derived from sulphonamides (QSO$_2$NCO), cyanic acid and thiocyanic acid.

See also for example, British patent number 1,453,258, for a discussion of suitable isocyanates.

Non-limiting examples of suitable isocyanates include: 1,6-hexamethylene diisocyanate, 1,4-butylene diisocyanate, furfurylidene diisocyanate, 2,4-toluene diisocyanate, 2,6-toluene diisocyanate, 2,4'-diphenylmethane diisocyanate, 4,4'-diphenylmethane diisocyanate, 4,4'-diphenylpropane diisocyanate, 4,4'-diphenyl-3,3'-dimethyl methane diisocyanate, 1,5-naphthalene diisocyanate, 1-methyl-2,4-diisocyanate-5-chlorobenzene, 2,4-diisocyanato-s-triazine, 1-methyl-2,4-diisocyanato cyclohexane, p-phenylene diisocyanate, m-phenylene diisocyanate, 1,4-naphthalene diisocyanate, dianisidine diisocyanate, bitolylene diisocyanate, 1,4-xylylene diisocyanate, 1,3-xylylene diisocyanate, bis-(4-isocyanatophenyl)methane, bis-(3-methyl-4-isocyanatophenyl)methane, polymethylene polyphenyl polyisocyanates and mixtures thereof. A more preferred isocyanate is selected from the group comprising 2,4-toluene diisocyanate, 2,6-toluene diisocyanate and mixtures thereof, for example, a mixture comprising from about 75 to about 85 percent by weight 2,4-toluene diisocyanate and from about 15 to about 25 percent by weight 2,6-toluene diisocyanate.

Another more preferred isocyanate is selected from the group comprising 2,4'-diphenylmethane diisocyanate, 4,4'-diphenylmethane diisocyanate and mixtures thereof. The most preferred isocyanate is a mixture comprising from about 15 to about 25 percent by weight 2,4'-diphenylmethane diisocyanate and from about 75 to about 85 percent by weight 4,4'-diphenylmethane diisocyanate.

If the process is utilized to produce a polyurethane foam, the active hydrogen-containing compound is typically a polyol. The choice of polyol is not particularly restricted and is within the purview of a person skilled in the art. For example, the polyol may be a hydroxyl-terminated backbone of a member selected from the group comprising polyether, polyester, polycarbonate, polydiene and polycaprolactone. Preferably, the polyol is selected from the group comprising hydroxyl-terminated polyhydrocarbons, hydroxyl-terminated polyformals, fatty acid triglycerides, hydroxyl-terminated polyesters, hydroxymethyl-terminated polyesters, hydroxymethyl-terminated perfluoromethylenes, polyalkyleneether glycols, polyalkylenearyleneether glycols and polyalkyleneether triols. More preferred polyols are selected from the group comprising adipic acid-ethylene glycol polyester, poly(butylene glycol), poly(propylene glycol) and hydroxyl-terminated polybutadiene—see, for example, British patent number 1,482,213, for a discussion of suitable polyols. Preferably, such a polyether polyol has a molecular weight in the range of from about 100 to about 10,000, more preferably from about 100 to about 4,000, most preferably from about 100 to about 3,500.

If the foam core element is to comprise a polyurea foam, the active hydrogen-containing compound comprises compounds wherein hydrogen is bonded to nitrogen. Preferably such compounds are selected from the group comprising polyamines, polyamides, polyimines and polyolamines, more preferably polyamines. Non-limiting examples of such compounds include primary and secondary amine terminated polyethers. Preferably such polyethers have a molecular weight of greater than about 100 and a functionality of from 1 to 25. Such amine terminated polyethers are typically made from an appropriate initiator to which a lower alkylene oxide is added with the resulting hydroxyl terminated polyol being subsequently aminated. If two or more alkylene oxides are used, they may be present either as random mixtures or as blocks of one or the other polyether. For ease of amination, it is especially preferred that the hydroxyl groups of the polyol be essentially all secondary hydroxyl groups. Typically, the amination step replaces the majority but not all of the hydroxyl groups of the polyol.

The reaction mixture used to produce the foamed isocyanate-based polymer core portion typically will further comprise a blowing agent. As is known in the art, water can be used as an indirect or reactive blowing agent in the production of foamed isocyanate-based polymers. Specifically, water reacts with the isocyanate forming carbon dioxide which acts as the effective blowing agent in the final foamed polymer product. Alternatively, the carbon dioxide may be produced by other means such as unstable compounds which yield carbon dioxide (e.g., carbamates and the like). Optionally, direct organic blowing agents may be used in conjunction with water although the use of such blowing agents is generally being curtailed for environmental considerations. The preferred blowing agent for use in the production of the present foamed isocyanate-based polymer comprises water.

It is known in the art that the amount of water used as an indirect blowing agent in the preparation of a foamed isocyanate-based polymer is conventionally in the range of from about 0.5 to as high as about 40 or more parts by weight, preferably from about 1.0 to about 10 parts by weight, based on 100 parts by weight of the total active hydrogen-containing compound content in the reaction mixture. As is known in the art, the amount of water used in the production of a foamed isocyanate-based polymer typically is limited by the fixed properties expected in the foamed polymer and by the tolerance of the expanding foam towards self structure formation.

To produce the foam core element made from a foamed isocyanate-based polymer, a catalyst is usually incorporated in the reaction mixture. The catalyst used in the reaction mixture is a compound capable of catalyzing the polymerization reaction. Such catalysts are known, and the choice and concentration thereof in the reaction mixture is within the purview of a person skilled in the art. See, for example, U.S. Pat. Nos. 4,296,213 and 4,518,778 for a discussion of suitable catalyst compounds. Non-limiting examples of suitable catalysts include tertiary amines and/or organometallic compounds. Additionally, as is known in the art, when the objective is to produce an isocyanurate, a Lewis acid must be used as the catalyst, either alone or in conjunction with other catalysts. Of course it will be understood by those skilled in the art that a combination of two or more catalysts may be suitably used.

Generally, the HR polyurethane foam suitable for use in the foam core element present vehicular seat element may be produced from the following general non-limiting formulation:

| Component | Amount |
| --- | --- |
| Polymer Polyol | 100-0 parts |
| Polyol | 0-100 parts |
| Crosslinker | 0-30 parts/100 parts total polyol |
| Catalyst | 0.05 to 3.5 parts/100 parts total polyol |
| Silicone Surfactants | 0-1.5 parts/100 parts total polyol |
| $H_2O$ | 0.5 to 25 parts/100 parts total polyol |
| Isocyanate | Adequate quantity for an index of from about 0.60 to 1.30 ratio of NCO equivalents to the equivalents of NCO reactive sites. |

Suitable crosslinkers, catalysts and silicone surfactants are described in U.S. Pat. Nos. 4,107,106 and 4,190,712.

The preferred HR polyurethane foam suitable for use in the foam core element in the present vehicular seat element may be produced from the following formulation:

| Component | Amount |
| --- | --- |
| Polymer Polyol | 20-100 parts |
| Polyol | 0-80 parts |
| Crosslinker | 5-15 parts/100 parts total polyol |
| Catalyst | 0.5-1.2 parts/100 parts total polyol |
| Silicone Surfactants | 0.3-1.1 parts/100 parts total polyol |
| $H_2O$ | 1.75-2.75 parts/100 parts total polyol |
| Isocyanate | Adequate quantity for an index of from about 0.8 to 1.1 ratio of NCO equivalents to the equivalents of NCO reactive sites. |

The rate sensitive foam element for use in the present vehicular seat element may produced, for example, according to any one or more of:

U.S. Pat. No. 6,617,369 [Parfondry et al.];
U.S. Pat. No. 6,790,871 [Farkas et al.];
U.S. Pat. No. 7,022,746 [Lockwood et al.];
U.S. Pat. No. 7,238,730 [Apichatachutapan et al.];
U.S. Pat. No. 8,362,098 [Goettke et al.];

U.S. Pat. No. 8,426,482 (Frericks et al.];
United States Patent Application Publication No. 2013/0085200 [Aou et al.];
United States Patent Application Publication No. 2013/0178548 [Aou et al.];
United States Patent Application Publication No. 2013/0225705 [Ma et al.];
International Publication Number WO 2013/045336A1 [Corinti et al.];
International Publication Number WO 2013/182527A1 [Franceschin et al.] and/or
International Publication Number WO 2014/058857A1 [Smiecinski et al.].

Embodiments of the present invention will now be described with reference to the following Example which is provided for illustrative purposes only and should not be used to limit or construe the invention.

EXAMPLE

In this example, a test seat bottom (Seat A) was compared against a commercially available front seat bottom (Seat B) taken from a Honda Accord vehicle and a reference front seat bottom (Seat C) having same size and shape of Seat B but made with two types of foam (described in more detail below).

Seat A comprised a rate sensitive seat (RSS) element and a HR foam element #1 having the physical properties set out in Table 1.

A production mold used to manufacture the commercially front seat bottom of a Honda Accord vehicle was used to product three foam parts: 100% RSS element, 100% HR foam element #1 and 100% HR foam element #2. The properties of HR foam element #2 are set out in Table 1.

The test seat bottom (Seat A) was fabricated by replacing the thigh portion of the 100% HR foam element #1, between the opposed bolster portions, with the 100% RSS foam element. The replacement was done in the thigh region illustrated in FIG. 1.

A schematic of the Seat A 102 is shown in FIG. 1. In this example, the Seat A 102 is illustrated as a seat bottom that defines a first major surface configured to be in contact with an occupant of the vehicle (labelled as A-surface 108) and a second major surface configured to be in contact with a support surface of the vehicle (labelled as B-surface 110) that opposes the first major surface. The Seat A 102 generally comprises a foam core element, which is illustrated as divided into a buttock region 104 and an under-thigh region 106. As illustrated, the under-thigh region 106 corresponds to approximately 200 mm (40%) of the front portion of the A-surface 108 of Seat A 102, while the buttock region 104 corresponds to approximately 300 mm (60%) of the rearward portion of the A-surface 108.

Seat B was made using 100% HR foam element #1 in the above-mentioned production mold used to manufacture the commercially front seat bottom of a Honda Accord vehicle.

Seat C was made in a manner similar to Seat A except HR foam element #2 was used in place of the RSS element.

It will be understood by those of skill in the art that Seat B and Seat C are comparative and are not encompassed by the scope of the present invention.

Seat A, Seat B and Seat C where subjected to the following static testing and dynamic testing.

The static testing was performed on a test population having the height and weight demographics set out in Table 2 using a protocol that included the following steps:

(i) mount the seat on a rigid fixture that secures it in a prescribed design position;
(ii) secure the seat to a platform with a foot rest located at the designated heel point distance from the seat H-point (as is known to those of skill in the art, in vehicle design, automotive design and vehicle regulation, the H-point (or hip-point) is the theoretical, relative location of an occupant's hip: specifically the pivot point between the torso and upper leg portions of the body—it can be measured relative to other features, especially the floor of the vehicle or the height above pavement: a vehicle said to have a "high H-point" may have an H-point that is "high" relative to the vehicle floor, the road surface or both);
(iii) place and secure the Body Pressure Distribution (BPD) mats on the seat surface;
(iv) have occupant sit in the seat and allow him/her to adjust the seat controls to position the seat in a configuration that they deem comfortable;
(v) after the occupant has reached a steady state, wait 30 seconds and then record a body pressure distribution scan; and
(vi) report the values for each seat as an average of all occupants for overall average body pressure and under-thigh body pressure.

The results of static testing are reported in Table 3. As can be seen in Table 3, both Seat A and Seat C exhibited changes in pressure readings for the overall seat surface and the in thigh region versus Seat B, which is comprised of the 100% HR foam element #1. While Seat C did exhibit a change, it was very minor and would not be expected to have an impact on occupant comfort. On the other hand the pressure reduction obtained in both measurements in Seat A, which was comprised of a rate sensitive seat (RSS) element and a HR foam element #1, is significantly higher and believed to be a significant improvement in occupant accommodation and comfort.

The dynamic testing was performed using a protocol that included the following steps:
(i) mount the seat on rigid a fixture that holds it in design position;
(ii) secure the seat to the base of a seat fatigue/vibration type tester and secure the BPD mat on the cushion surface;
(iii) lower a 61 kg guided mass, in the shape of a SAE AM buttock form, onto the seat cushion;
(iv) allow the mass to rest on the seat surface for 30 seconds and record a body pressure distribution scan—this is the pre-conditioned pressure measurement;
(v) input a vertically oscillating displacement of ±20 mm to the base of the seat at a frequency of 2.3 Hz; and
(vi) after 15 minutes has elapsed stop the test, let the mass settle for 30 seconds and record a second BPD scan—this is the post-conditioned pressure measurement.

The results of dynamic testing are reported in Table 4. As can be seen in Table 4, both Seat A and Seat C exhibited changes in pressure readings for the overall seat surface and the in thigh region versus Seat B, which is comprised of the 100% HR foam element #1. These changes were realized before the dynamic input was applied to the seat (pre-conditioning phase) and thereafter (post-conditioning phase). While Seat C did exhibit a change that would positively impact occupant comfort, it was not as significant as the results for Seat A. Seat A, which is comprised of a rate sensitive seat (RSS) element and a HR foam element #1, had significantly higher pressure reduction, essentially twice the amount obtained in Seat C. These higher changes are believed to result in greater improvement in occupant accommodation and comfort.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

TABLE 1

| Property | RSS Element | HR Foam Element #1 | HR Foam Element #2 |
|---|---|---|---|
| Density (kg/m$^3$), ASTM D3575-11 (Test A) | 50 | 54 | 50 |
| Indentation Load Deflection (ILD) at 50% (N), ASTM D3574-11 (Test B$_1$). | 135 | 413 | 262 |
| Hysteresis loss (%), ASTM D3574-11 (Appendix X6.2 - Procedure A) | 34 | 31 | 35 |
| Tear strength (N/m), ASTM D3574-11 (Test F) | 532 | 836 | 630 |
| Tensile strength (kPa), ASTM D3574-11 (Test E) | 138 | 186 | 165 |
| Elongation (%), ASTM D3574-11 (Test E) | 210 | 123 | 127 |
| 50% wet compression set (%), ASTM D3574-11 (Test L) | 3 | 13 | 15 |
| Ball rebound (%), ASTM D3574-11 (Test H) | 30 | 65 | 64 |
| Constant Force Pounding (CFP) ILD loss (%), ASTM D3574-11 (Test I$_3$) | 9 | 17 | 20 |
| Constant Force Pounding (CFP) height loss (%), ASTM D3574-11 (Test I$_3$) | 2 | 3 | 4 |

TABLE 2

| Male | | Female | |
|---|---|---|---|
| Height (m) | Weight (kg) | Height (m) | Weight (kg) |
| 1.57 1.68 | 58.97 68.04 | 1.52 1.63 | 44.91 53.98 |
| 1.68 1.78 | 74.84 83.46 | 1.60 1.73 | 58.97 68.04 |
| 1.78 1.88 | 90.72 103.87 | 1.73 1.83 | 71.67 81.65 |

TABLE 3

| | Average Pressure (kPa) | | Average Pressure Change (%) | |
|---|---|---|---|---|
| Seat | Overall | Thighs | Overall | Thighs |
| Seat B | 4.75 | 4.42 | Reference | |
| Seat C | 4.64 | 4.49 | −2.3 | 1.6 |
| Seat A | 4.17 | 3.36 | −12.2 | −24.0 |

TABLE 4

| | Average Pressure (kPa) | | Average Pressure Change (%) | |
|---|---|---|---|---|
| Seat | Overall | Thigh | Overall | Thigh |
| Pre-Conditioning | | | | |
| Seat B | 5.44 | 5.40 | Reference | |
| Seat C | 5.07 | 4.65 | −6.8 | −13.9 |
| Seat A | 4.51 | 2.87 | −17.1 | −46.9 |
| Post-Conditioning | | | | |
| Seat B | 6.14 | 6.62 | Reference | |
| Seat C | 5.59 | 5.08 | −9.0 | −23.3 |
| Seat A | 4.78 | 3.16 | −22.1 | −52.3 |

What is claimed is:

1. A vehicular seat element for a vehicle, the vehicular seat element comprising:
   a rate sensitive foam element defining a first major surface, wherein the rate sensitive foam element is arranged to serve as an outermost foam element of the vehicular seat element and the first major surface defines a seating surface for an occupant of the vehicle; and
   a foam core element defining a second major surface configured to be in contact with a support surface of the vehicle,
   wherein the foam core element and the rate sensitive foam element are different elements, the foam core element being secured to the rate sensitive foam element at a surface that is opposed the first major surface.

2. The vehicular seat element defined in claim 1, wherein the foam core element comprises a high resiliency (HR) polyurethane foam having a density in the range of from about 50 to about 60 kg/m3 when determined according to ASTM D3574-11 (Test A).

3. The vehicular seat element defined in claim 1, wherein the foam core element comprises a HR polyurethane foam having a tear strength in the range of from about 800 to about 900 N/m when determined according to ASTM D3574-11 (Test F).

4. The vehicular seat element defined in claim 1, wherein the foam core element comprises a HR polyurethane foam having an elongation at break in the range of from about 110% to about 140% when determined according to ASTM D3574-11 (Test E).

5. The vehicular seat element defined in claim 1, wherein the foam core element comprises a HR polyurethane foam having a tensile strength in the range of from about 180 to about 200 kPa when determined according to ASTM D3574-11 (Test E).

6. The vehicular seat element defined in claim 1, wherein the foam core element comprises a HR polyurethane foam having a ball rebound in the range of from about 60% to about 70% when determined according to ASTM D3574-11 (Test H).

7. The vehicular seat element defined in claim 1, wherein the foam core element comprises a HR polyurethane foam having a hysteresis loss of from about 20% to about 30% when determined according to ASTM D3574-11 (Appendix X6.2—Procedure A).

8. The vehicular seat element defined in claim 1, wherein the foam core element comprises a HR polyurethane foam having an indentation load deflection at 50% at 100 mm thickness in the range of from about 230 N to about 400 N when determined according to ASTM D3574-11 (Test $B_1$).

9. The vehicular seat element defined in claim 1, wherein the foam core element comprises a HR polyurethane foam having a 50% wet compression set in the range of from about 10% to about 15% when determined according to ASTM D3574-11 (Test L).

10. The vehicular seat element defined in claim 1, wherein the foam core element comprises a HR polyurethane foam having a constant force pounding (CFP) indentation force deflection loss in the range of from about 10% to about 18% when determined according to ASTM D3574-11 (Test $I_3$).

11. The vehicular seat element defined in claim 1, wherein the foam core element comprises a HR polyurethane foam having a CFP height loss in the range of from about 2% to about 5% when determined according to ASTM D3574-11 (Test $I_3$).

12. The vehicular seat element defined in claim 1, wherein the rate sensitive foam element has a density in the range of from about 50 to about 60 kg/m3 when determined according to ASTM D3574-11 (Test A).

13. The vehicular seat element defined in claim 1, wherein the rate sensitive foam element has a tear strength in the range of from about 450 to about 550 N/m when determined according to ASTM D3574-11 (Test F).

14. The vehicular seat element defined in claim 1, wherein the rate sensitive foam element has an elongation at break in the range of from about 200% to about 275% when determined according to ASTM D3574-11 (Test E).

15. The vehicular seat element defined in claim 1, wherein the rate sensitive foam element has a tensile strength in the range of from about 120 to about 180 kPa when determined according to ASTM D3574-11 (Test E).

16. The vehicular seat element defined in claim 1, wherein the rate sensitive foam element has a ball rebound in the range of from about 15% to about 35% when determined according to ASTM D3574-11 (Test H).

17. The vehicular seat element defined in claim 1, wherein the rate sensitive foam element has a hysteresis loss of from about 25% to about 40% when determined according to ASTM D3574-11 (Appendix X6.2—Procedure A).

18. The vehicular seat element defined in claim 1, wherein the rate sensitive foam element has an indentation load deflection at 50% at 100 mm thickness in the range of from about 80 N to about 150 N when determined according to ASTM D3574-11 (Test $B_1$).

19. The vehicular seat element defined in claim 1, wherein the rate sensitive foam element has an 50% wet compression set in the range of from about 1% to about 5% when determined according to ASTM D3574-11 (Test L).

20. The vehicular seat element defined in claim 1, wherein the rate sensitive foam element has a CFP indentation force deflection loss in the range of from about 7% to about 13% when determined according to ASTM D3574-11 (Test $I_3$).

21. The vehicular seat element defined in claim 1, wherein the rate sensitive foam element has a CFP height loss in the range of from about 1% to about 3% when determined according to ASTM D3574-11 (Test $I_3$).

22. The vehicular seat element defined in claim 1, wherein the rate sensitive foam element has a ratio of hysteresis loss when determined according to ASTM D3574-11 (Appendix X6.2—Procedure A) to ball rebound when determined according to ASTM D3574-11 (Test H) in the range of from about 0.8 to about 1.5.

23. The vehicular seat element defined in claim 1, wherein the vehicular seat element, during static testing, has an overall average pressure applied to an occupant of from about 7% to about 10% less an overall average pressure applied to an occupant during static testing by a reference vehicular seat element of the same size and shape made with 100% foam used in the foam core element.

24. The vehicular seat element defined in claim 1, wherein the vehicular seat element, during static testing, has an average pressure applied to an under-thigh portion of an occupant of from about 15% to about 25% less an average pressure applied to an under-thigh portion an occupant during static testing by a reference vehicular seat element of the same size and shape made with 100% foam used in the foam core element.

25. The vehicular seat element defined in claim 1, wherein the vehicular seat element, during a pre-conditioning portion of dynamic testing, has an overall average pressure of from about 15% to about 20% less an overall average pressure during a pre-conditioning portion dynamic testing of a vehicular seat element of the same size and shape made with 100% foam used in the foam core element, wherein the pre-conditioning portion of dynamic testing comprises measuring the overall average pressure applied to a 61 kg mass placed on the first major surface of the vehicular seat element for 30 seconds.

26. The vehicular seat element defined in claim 1, wherein the vehicular seat element, during a pre-conditioning portion of dynamic testing, has an under-thigh average pressure of from about 35% to about 45% less an under-thigh average pressure during a pre-conditioning portion dynamic testing of a vehicular seat element of the same size and shape made with 100% foam used in the foam core element, wherein the pre-conditioning portion of dynamic testing comprises measuring the overall average pressure applied to a 61 kg mass placed on the first major surface of the vehicular seat element for 30 seconds.

27. The vehicular seat element defined in claim 1, wherein the vehicular seat element, during a post-conditioning portion of dynamic testing, has an overall average pressure of from about 10% to about 22% less an overall average pressure during a post-conditioning portion of dynamic testing of a vehicular seat element of the same size and shape made with 100% foam used in the foam core element, wherein the post-conditioning portion of dynamic testing comprises: (i) placing a form having a mass of 61 kg on the first major surface of the vehicular seat element, (ii) vertically oscillating the vehicular seat element ±20 mm at 2.3 Hz for 15 minutes, (iii) waiting 30 seconds after completion of (ii), and (iv) measuring the overall average pressure applied to the form.

28. The vehicular seat element defined in claim 1, wherein the vehicular seat element, during a post-conditioning portion of dynamic testing, has an average under-thigh pressure of from about 40% to about 55% less an average under-thigh pressure during a post-conditioning portion of dynamic testing of a vehicular seat element of the same size and shape made with 100% foam used in the foam core element, wherein the post-conditioning portion of dynamic testing comprises: (i) placing a form having a mass of 61 kg on the first major surface of the vehicular seat element, (ii) vertically oscillating the vehicular seat element ±20 mm at 2.3 Hz for 15 minutes, (iii) waiting 30 seconds after completion of (ii), and (iv) measuring the average pressure applied to an under-thigh portion of the form.

29. The vehicular seat element defined in claim 1, wherein first major surface comprises a rearwardly disposed under-buttocks portion and a frontwardly disposed under-thigh portion adjacent thereto, the rate sensitive foam element being disposed in the under-thigh portion of the first major surface.

* * * * *